United States Patent [19]

Gross

[11] 3,923,586

[45] Dec. 2, 1975

[54] EVACUABLE MEMBRANE APPARATUS FOR TIRE RECAPPING

[76] Inventor: Jerome A. Gross, 6304 S. Rosebury, Clayton, Mo. 63101

[22] Filed: Oct. 21, 1974

[21] Appl. No.: 516,188

Related U.S. Application Data

[63] Continuation-in-part of Ser. No. 374,675, June 28, 1973, Pat. No. 3,847,695.

[52] U.S. Cl. ............... 156/394; 156/96; 156/128 R; 264/315; 264/316; 264/326; 425/43; 425/44; 425/45; 425/390
[51] Int. Cl.² ......................................... B29H 17/00
[58] Field of Search .......... 156/96, 128 R, 394 FM; 264/315, 316, 326; 425/43, 44, 45, 390

[56] References Cited
UNITED STATES PATENTS

| | | | |
|---|---|---|---|
| 1,158,389 | 10/1915 | Piper | 264/316 X |
| 1,483,857 | 2/1924 | Fitzharris | 156/394 FM |
| 1,554,016 | 9/1925 | Midgley | 425/43 |
| 2,014,010 | 9/1935 | Wheatley | 156/394 FM |
| 2,345,172 | 3/1944 | Bacon | 425/43 |
| 2,353,996 | 7/1944 | Cooke et al. | 264/315 |
| 2,468,121 | 4/1949 | Shell | 156/394 FM |
| 2,489,643 | 11/1949 | Hunter | 156/394 FM |
| 3,004,295 | 10/1961 | Bottoms et al. | 264/315 |
| 3,236,709 | 2/1966 | Carrer | 156/394 FM |
| 3,729,358 | 4/1973 | Barefoot | 156/394 FM |
| 3,730,801 | 5/1973 | Martin | 156/128 R |
| 3,743,564 | 7/1973 | Gross | 156/394 FM |
| 3,837,385 | 9/1974 | Schelkmann | 156/96 |
| 3,846,201 | 11/1974 | Huskins | 156/128 R |
| 3,847,695 | 11/1974 | Gross | 156/96 |

FOREIGN PATENTS OR APPLICATIONS

| | | | |
|---|---|---|---|
| 905,273 | 7/1972 | Canada | 156/394 FM |

*Primary Examiner*—Clifton B. Cosby

[57] ABSTRACT

Evacuable membrane apparatus permits vulcanizing pre-formed tread strips to tire casings in a pressure chamber without danger of leakage of its pressurized air between the evacuated membranes. The outer margins of upper and lower membranes are clamped between a pressure bar hoop and the inflated resilient face of a pressure-resisting rim. By applying inflation pressure to the rim in excess of the chamber pressure, the membrane edges are clamped so tightly that the chamber air will not enter between them even after the membranes are evacuated.

4 Claims, 6 Drawing Figures

3,923,586

EVACUABLE MEMBRANE APPARATUS FOR TIRE RECAPPING

It is a continuation-in-part of my co-pending application Ser. No. 374,675 filed June 28, 1973; now U.S. Pat. No. 3,847,695.

BACKGROUND OF THE INVENTION

This invention relates to recapping tires in a pressure chamber by use of evacuable membranes.

In prior art apparatus, complicated provisions have been made for the sealing of membranes which envelope the tire casing and tread strip during the vulcanizing operation in a pressure chamber. Thus, in U.S. Pat. No. 3,236,709 to Carver casing-enveloping membranes are secured between the beads of the casing and a wheel rim, and held sealed by maintaining a pressure within the casing of 35 p.s.i. in excess of the ambient pressure within the pressure chamber. To apply such excess sealing pressure requires complex apparatus as the pressure within the chamber is increased above and subsequently reduced to atmospheric pressure.

In the apparatus of Applicant's co-pending application, the elastic sealing membranes have molded rounded edge margins, to fit over the outer surface of a metal rim or hoop against which it may be sealed. To so mold the outer edges of the membranes is expensive and undesirable where, in rough usage, the membranes may have to be frequently replaced.

The principal object of the present invention, therefore, is to achieve positive pressure sealing of the membrane edges, to avoid entrance between the evacuated membranes of the pressurized air within the pressure chamber, by apparatus utilizing preferably flat elastic membranes which may be replaced without excessive cost.

SUMMARY OF THE INVENTION

The present evacuable membrane apparatus consists of a pair of upper and lower air-impermeable membranes which either are normally flat elastic sheet or have normally planar margins, extending beyond the diameter of the casing to be recapped. Their outer margins are clamped sealedly in a rigid fixture, whose members include a circular pressure-resisting rim having a continuous resilient face over which the lower membrane is secured. The upper membrane's margin is drawn over and secured to a circular pressure bar hoop narrower than the width of the rim's resilient face and of such radius as to fit therewith. The hoop is secured in place over the resilient face of the rim. Pressure is then applied between them, as hereinafter described.

In the preferred embodiment, illustrated herein, the resilient face of the rim is an annular hose-like inflatable pressure bag which has connecting means through which air pressure may then be applied, at a pressure in excess of the pressure to be encountered in the pressure chamber. After the membrane margins are sealedly clamped, and with a rounded inner tube in the casing connected through one of the membranes to the ambient atmosphere, the membranes are evacuated, leaving the casing supported by the ambient air pressure within the tube. The casing may then be vulcanized in the pressure chamber, without danger of entrance of its pressurized air between the evacuated membranes.

DESCRIPTION OF THE PREFERRED EMBODIMENT

Figure 1:
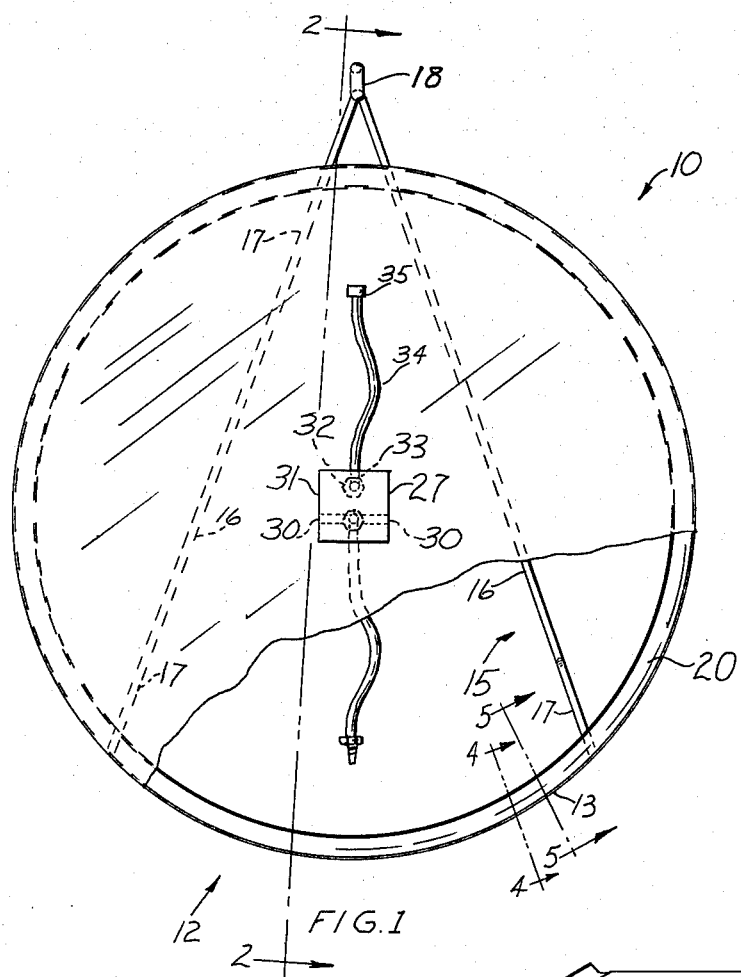
FIG. 1 is a plan view of the lower member of the preferred apparatus, with the membrane thereon partly broken away.
Figure 2:
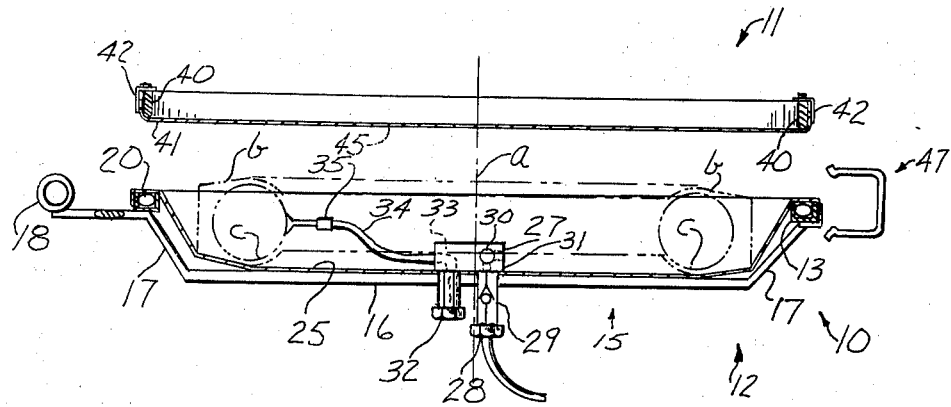
FIG. 2 is a cross-sectional view taken along line 2—2 of FIG. 1, showing the upper membrane in exploded position thereover together with two attaching clips. The membrane of the lower member is shown drawn downward by a tire casing positioned thereon, shown in phantom lines.

The preferred embodiment shown in the drawings includes two principal assemblies, a lower apparatus assembly generally designated 10 and an upper apparatus assembly generally designated 11. The lower assembly 10 includes a rigid fixture, itself generally designated 12 made up of an annular channel 13 presented upwardly so that its hollow concentric face 14 is presented in the direction of and around a central axis $a$. The channel 13 is mounted on a pair of support rods or tubes generally designated 15, bent as shown in FIG. 2. As there seen, its central parts 16 may rest on a horizontal surface, with its bent-up outer rod parts 17 welded to the undersurface of the channel 13 to support it in a plane somewhat below the midplane of a tire casing $b$ to be retreaded, as shown in FIG. 2. Preferably the support rods 15 are not parallel but converge, as seen in FIG. 1, a short distance outward of the channel 13, where they are bent upward and welded to a suspension ring 18.

Figure 4:
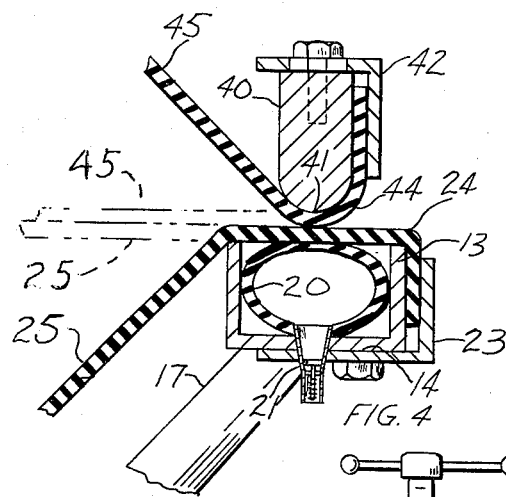
FIG. 4 is an enlarged detail section taken along line 4—4 of FIG. 1, with the upper member of FIG. 2 shown in place thereon.
Figure 5:
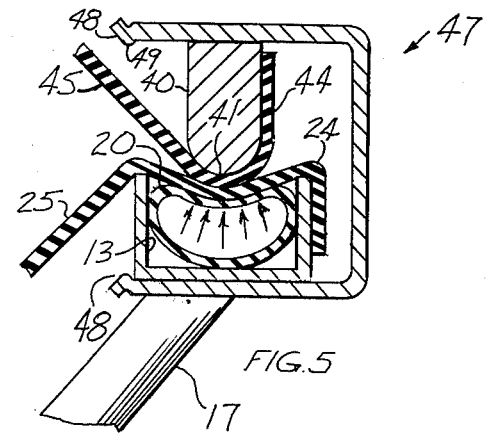
FIG. 5 is an enlarged detail similar to FIG. 4 at a position corresponding to line 5—5 of FIG. 1, showing the pressurized rim inflated. The evacuated position of the membranes is shown in phantom lines.

Seated in the concentric face 14 of the channel 13 is an annular hoselike inflatable pressure bag 20 whose construction is best seen in FIGS. 4 and 5. The pressure bag 20 may be formed, as is conventional, of plies of fabric impregnated with silicone rubber, to afford it strength and resistance to "ballooning" under inflation pressures; such pressures should be of the general order of 100 p.s.i., to exceed the conventional 85 p.s.i. pressure used in heated pressure chambers when preformed tread strips are vulcanized onto tire casings. Air pressure to the pressure bag 20 is supplied through an inflation valve 21 seen in FIG. 4.

Several screw-held retention slotted clips 23, mounted along the under and outer surface of the channel 13 as shown in FIG. 4, are used to clamp the outer margin 24 of a lower circular air impermeable membrane 25. The membrane 25 is preferably elastic sheet rubber cured at a temperature at least equal to that to be used in the vulcanizing operation. Affixed at approximately its center is a spacing block 27 preferably formed of aluminum, whose lower face abuts the membrane 25 and has a first pressure tight connection therethrough to a vacuum coupling 28 containing a conventional vacuum check valve 29. Communicating through the block 27 to the vacuum coupling 28 is a multi-branched vacuum passage 30 having inlets in the edge 31 of the spacing block 27.

A second pressure tight connection through the lower membrane 25 to the spacing block 27 terminates outwardly in an inflation coupling 32 which in the preferred embodiment is valveless. It communicates through an inflation passage 33 to a pressure-resistant, preferably steel-walled flexible conduit 34 having at its outer end a screw coupling 35 to the stem of an inner tube c, positioned within the tire casing b.

The upper apparatus assembly 11 comprises a rigid metal hoop 40, whose lower edge 41 is narrower than the pressure bag 20 which forms the resilient face of the channel rim 13. The metal hoop 40 is of such radius as to fit within the channel 13 against the face of the pressure bag 20.

Slotted retention clips 42, similar to the retention clips 23 of the lower assembly, mounted by screws in the upper edge of the hoop 40, hold the outer margin 44 of an upper air impermeable membrane 45. Preferably the upper membrane is formed of the same elastic rubber material as the lower membrane 25. When assembled to the hoop 40 it may appear as seen in the exploded view FIG. 2. Since it is not necessary to stretch the membranes 25, 45 but merely to present their margins 24, 44 evenly against each other, the mid portions of the upper membrane 45 may sag somewhat from the position illustrated.

Figure 3:
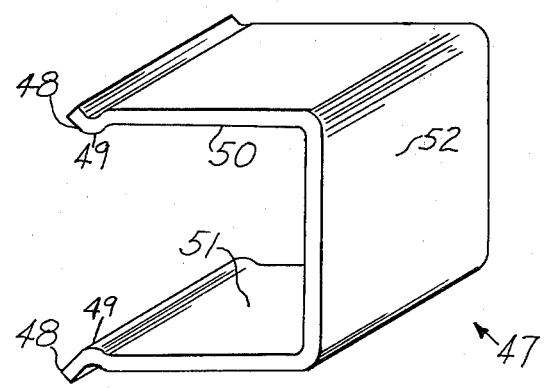
FIG. 3 is an enlarged perspective view of one of the clips of FIG. 2.

To secure the lower and upper assemblies 10, 11 together, simple rigid clips generally designated 47, as illustrated in FIG. 3, may be used. These clips 47 are formed of general C-shaped configuration, having flared entrant portions 48 leading to detent ridges 49 at which commence the parallel upper and lower walls 50, 51 rigidly connected by an outer web 52. As seen in FIG. 5, the function of the clips 47 is to secure the hoop 40 in position relative to the channel rim 13 and to resist the pressure subsequently to be applied to the pressure bag 20.

Except for the manner of sealing the outer edges of the membranes 25, 45, the present apparatus is used in substantially the manner shown in my said co-pending application. A tire casing b is prepared for recapping by buffing off the remaining original tread leaving a substantially cylindrical outer surface, and applying thereto a suitable adhesive vulcanizable gum rubber and a perimetral length of pre-formed tread strip. An uninflated inner tube c is placed within the casing b.

The lower apparatus assembly is placed on a suitable work support surface, preferably having a hollow center through which a vacuum and air pressure lines are drawn, and connected to the vacuum check valve 29 and the inflation coupling 32. A tire casing b of any diameter which may be received within the channel 13 with substantial clearance such as shown in FIG. 2, is placed centered over and upon the lower membrane 25, stretching it downward to the contour shown in FIG. 2.

The coupling 35 of the flexible conduit 34 is then secured to the stem of the inner tube c, and a small amount of air is delivered from the inflation coupling 32 through the passage 33 and conduit 34 to the tube c, sufficient to bring it to roundness. A visual check is made of its roundness and position within the casing b.

The upper apparatus assembly is then positioned with the upper membrane 45 above the upper side wall of the tire casing b; its hoop 40 is then placed downward so that the hoop lower edge 41 is brought into contact with the pressure bag 20, and three or four retention clips 23 are applied at angular intervals. Each is pressed radially inward so that its detent ridges 49 pass over the channel 13 and hoop 40 to secure them in position as shown in FIG. 5. This brings together the outer margins 44, 24 of the upper and lower membranes 25, 45.

To assure a positive seal of these membrane margins, air under pressure is introduced through the inflation valve 21 into the pressure bag 20 which lies within the annular channel 13. The pressure so introduced causes it to swell from its relatively flat oval position shown in solid lines in FIG. 5 to the inflated position shown in phantom lines therein. Assuming that a pressure of approximately 85 p.s.i. will ultimately be utilized in an autoclave or other heated pressure chamber, the pressure bag 20 is preferably inflated to a somewhat higher pressure, say 100 p.s.i. The retention clips 23 hold the hoop 40 fixedly, and any slight deflection of the hoop 40 between the clips 23 is filled in by the pressure bag 20, which regardless of such deflection exerts its pressure evenly around the entire portion of the membrane margins 24, 44.

Having so clamped the membrane margins 24, 44, a source of suction is applied to the vacuum coupling 28, drawing out air between the membranes 25, 45 including all air which surrounds the rounded inner tube c, as taught in my co-pending application. The source of vacuum is then withdrawn causing the check valve 29 to hold the vacuum so drawn. Since the outside atmospheric air pressure does not exceed that in the inner tube c, it will retain its shape, and the source of air pressure is then disconnected from the inflation coupling 32.

The entire assembly may then be lifted by the suspension ring 18 and hung within an autoclave. The vacuum coupling 28 is then connected to a hose which extends through the wall of the pressure chamber, preferably to to a source of vacuum, so that before pressurization the vacuum between the membranes will be preserved despite any leaks which may exist. However, once the pressure in the chamber is elevated, its excess over atmospheric pressure is sufficient to hold the membranes firmly in place as the vulcanization progresses and to expel through such hose the gases generated on vulcanization.

When the pressure chamber is sealed and the pressure therein increased such pressure will be communicated through the open inflation coupling 32, passage 33 and conduit 34 to the inner tube c, so that its pressure will always be equal to the chamber pressure. Thus increases and decreases of chamber pressure will not tend to crush or otherwise distort the shape of the tire casing b.

Figure 6:
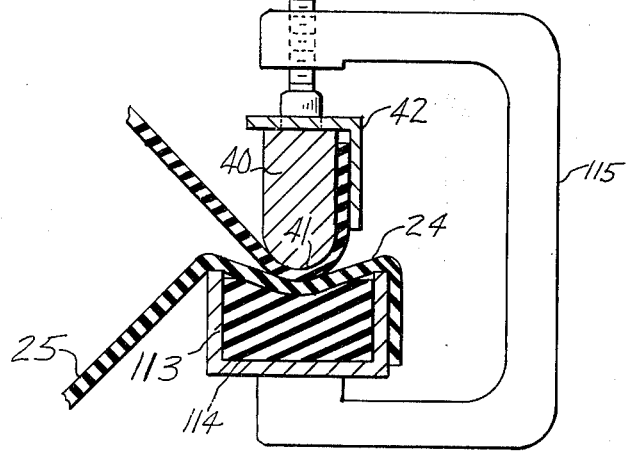
FIG. 6 is a schematic cross sectional detail, generally similar to FIG. 5, of an alternate embodiment of the invention.

An alternate embodiment of the present invention is shown in the enlarged fragmentary view FIG. 6. Here an annular channel 113 is substantially filled with a resilient heat-resistant rubber 114. A lower membrane 25 is secured to the annular channel 113 in the same manner as heretofore described. The upper fixture assembly 11 is identical with that heretofore described.

Instead of using clips, the upper assembly 11 is secured over the annular channel 113 by conventional C-clamps 115, which serve both to position the lower and upper assemblies and apply a pressure to the edges of the membranes to exceed the pressure within the chamber to be utilized. While this embodiment has the advantage of simplicity, deflection of the hoop 40 of the upper assembly 11 will not be compensated for by the elastic resilience of the rubber fill 114 with the same certainty as in the prior embodiment, where the pressure bag 20 is utilized.

As with the invention of my co-pending application, a single set of the present apparatus will recap tire casings of a broad size range without regard to variations in outer diameter, rim diameter or width. In the present apparatus, there is vastly improved reliability of sealing of the marginal edges of the membranes; and the present flat membranes are relatively inexpensive and easily replaced.

It is to be understood that inward of their flat margins the inner, casing-enveloping portions of the membranes may be pre-molded to approximate final shape, thus lessening the need for elastic stretch; and if so pre-molded, membranes of suitable heat-resistant plastic may be substituted. In either event the outer margins of the membranes will be normally planar, for sealing against each other between the rim and hoop as described.

While air is the fluid customarily used for applying pressure to membranes in the process of recapping tires with pre-formed tread strips, other fluids having better heat transfer characteristics, e.g. water, may be used, making such adaptations to the apparatus as will be obvious. These and other changes from the described embodiments may be made within the teachings of the present invention.

I claim:

1. For use in a pressurizable chamber for vulcanizing a pre-formed tread strip to a tire casing containing an inner tube, evacuable membrane apparatus comprising an upper and a lower air-impermeable casing-enveloping membrane, each having a normally planar outer margin extending beyond such tire casing, at least one of said membranes having an air evacuation outlet and a tube communicating therefrom to the outer side of such pressure chamber, and having an air inlet having a conduit between said membranes and connectable to such inner tube, together with a rigid fixture comprising a resilient pressure rim whose radius does not exceed that of the radially outer membrane portions, the rim having a continuous resilient face, the fixture further including a circular pressure bar hoop narrower than the width of the resilient face of the rim and of such radius as to fit therewith, means to secure the hoop in position relative to the rim, and means to apply pressure between the pressure bar hoop and the resilient face of the rim, whereby to clamp therebetween the margins of the upper and lower membranes sealedly at a pressure in excess of the pressure of such vulcanizing chamber.

2. Evacuable membrane apparatus as defined in claim 1, wherein the resilient face of the rim is an annular hose-like inflatable pressure bag and said means to apply pressure comprises means to inflate said pressure bag, whereby, on inflation to a pressure in excess of the pressure within the chamber, to prevent leakage of air from the pressurized chamber between the marginal portions of the membrane means.

3. Evacuable membrane apparatus as defined in claim 1, wherein the said upper and lower membranes are of flat stretchable rubber sheet material.

4. Evacuable membrane apparatus as defined in claim 1, wherein the resilient face of the rim is formed of a compressible rubber-like material and is broader than the width of the hoop, and the said means, to secure the hoop in position and to apply pressure, together comprise a plurality of clamps.

* * * * *